United States Patent
Lewellyn (10) Patent No.: US 9,802,449 B1
(45) Date of Patent: Oct. 31, 2017

(54) CONTROLLED TIRE DEFLATION VALVE SYSTEM

(71) Applicant: Harry Lewellyn, Costa Mesa, CA (US)

(72) Inventor: Harry Lewellyn, Costa Mesa, CA (US)

( * ) Notice: Subject to any disclaimer, the term of this patent is extended or adjusted under 35 U.S.C. 154(b) by 0 days.

(21) Appl. No.: 15/009,107

(22) Filed: Jan. 28, 2016

(51) Int. Cl.
*B60C 29/00* (2006.01)
*B60C 29/06* (2006.01)

(52) U.S. Cl.
CPC .......... *B60C 29/066* (2013.01); *B60C 29/068* (2013.01); *Y10T 137/374* (2015.04); *Y10T 137/3786* (2015.04)

(58) Field of Classification Search
CPC . B60C 29/066; B60C 29/068; Y10T 137/374; Y10T 137/3786
See application file for complete search history.

(56) References Cited

U.S. PATENT DOCUMENTS

| 1,887,293 | A | * | 11/1932 | Dunois | B60C 29/06 137/233 |
| 8,651,144 | B1 | * | 2/2014 | Tsai | F16K 15/205 137/227 |

FOREIGN PATENT DOCUMENTS

AU   WO2002062595 A1   8/2002

OTHER PUBLICATIONS http://www.coyoteents.com/deflators-compare-to-others.html, at least by Dec. 2014.

* cited by examiner

*Primary Examiner* — Kevin Lee (57) ABSTRACT

The present invention overcomes the shortcomings of the current trial and error method in deflating tires. The controlled tire deflation valve system allows for tires to automatically and accurately deflate to the desired pressure. The present invention comprises a shaft, a spring and a piston wherein the shaft runs through the spring until the spring rests on the shaft spring seat. The shaft spring seat is effective in restricting the movement of the spring.

13 Claims, 8 Drawing Sheets

CONTROLLED TIRE DEFLATION VALVE SYSTEM

BACKGROUND OF THE INVENTION

For certain applications, slightly deflated tires perform better than fully inflated ones. Currently, tire deflation is achieved through a trial and error process. Air is released from the tire then the pressure within the tire is measured. This repeats until the desired lower pressure is reached. This method is inefficient, is time-consuming, and compromises the accuracy of the pressure desired.

DETAILED DESCRIPTION OF EMBODIMENTS

Surprisingly, the present invention overcomes the shortcomings of the current trial and error method in deflating tires. In particular, the controlled tire deflation valve system (100) allows for tires to automatically and accurately deflate to the desired pressure.

Here, the controlled tire deflation valve system (100) comprises a shaft (410), a spring (450), and a piston (510). In some embodiments, the shaft (410) comprises a shaft first end (420) and a shaft second end (430). The shaft tip (460) may be rounded or pointed and is disposed on the shaft second end (430). The spring (450) is disposed adjacent to the shaft (410) and rests on a shaft spring seat (470). In some embodiments, the spring (450) is disposed concentric with the shaft (410) and rests on a shaft spring seat (470). In a non-limiting example, the shaft (410) runs through the spring (450) until the spring (410) rests on the shaft spring seat (470). The shaft spring seat (470) is effective in restricting the movement of the spring (450).

In some embodiments, the piston (510) comprises a piston first end (520), a piston second end (530), and a piston surface (560) disposed on the piston second end (530). Furthermore, a piston seal (550) is attached to the piston surface (560). In some embodiments, a piston cavity (540) is formed from the piston surface (560) towards the piston first end (520). A piston shaft rest surface (570) is disposed at the bottom of the piston cavity (540). In some embodiments, the piston shaft rest surface (570) comprises a piston central point (571) and a centrally disposed piston channel (572).

Figure 1:
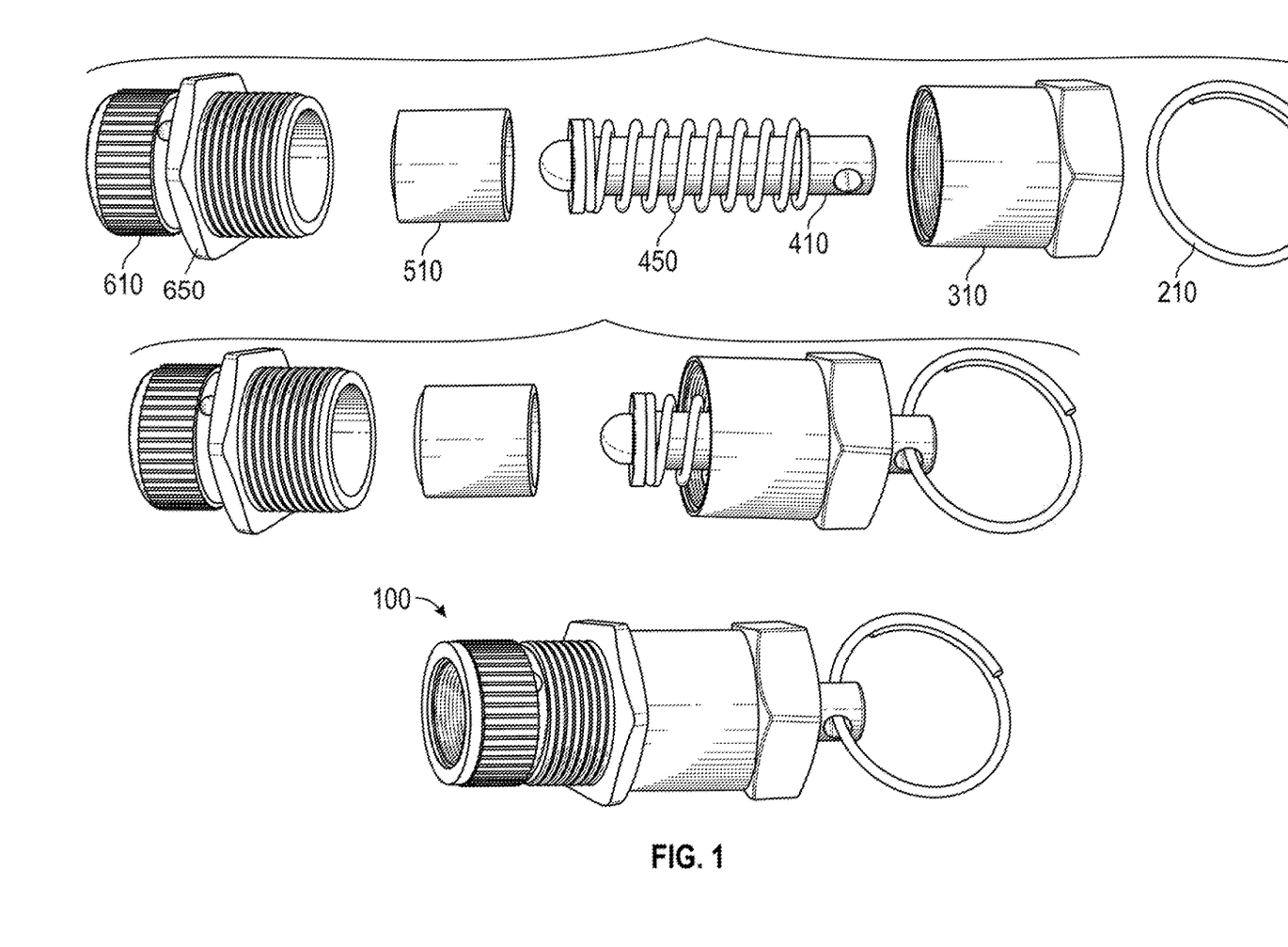
FIG. 1 shows an exploded view of the controlled tire deflation valve system (100), showing the main cylinder (610), the piston (510), the shaft (410), the adjustment cap (310), and the insert component (210) (top row); a semi-exploded view of the controlled tire deflation valve system (100), showing the shaft (410) inserted into the adjustment cap (310) and secured in place by the insert component (210) (middle row); an assembled view of the controlled tire deflation valve system (100) (bottom row).

In some embodiments, the piston (510) is sandwiched between the shaft tip (460) and a main cylinder seal seat (690). The piston seal (550) is disposed adjacent to the main cylinder seal seat (690) and the shaft tip (460) rests on the piston channel (572).

Figure 14:
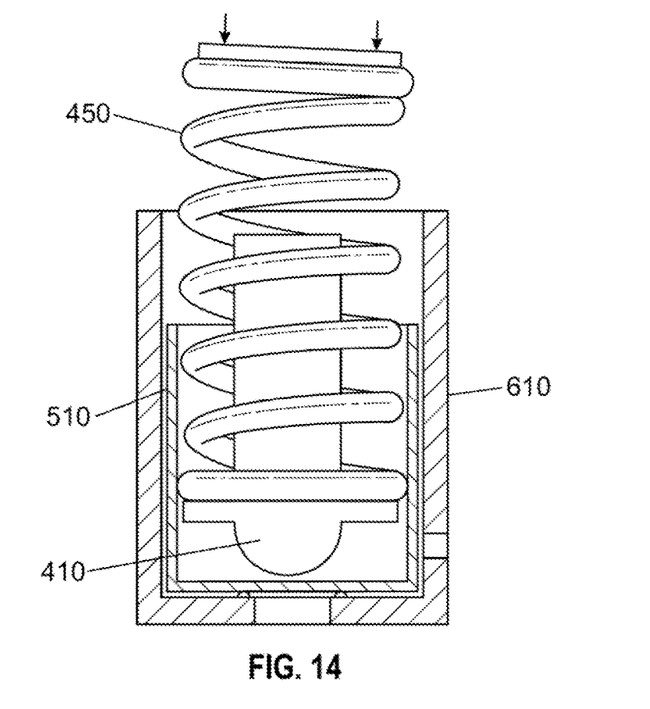
FIG. 14 shows the shaft (410) acting as a force equalizer, evenly distributing applied force to provide a uniform seal.
Figure 15:
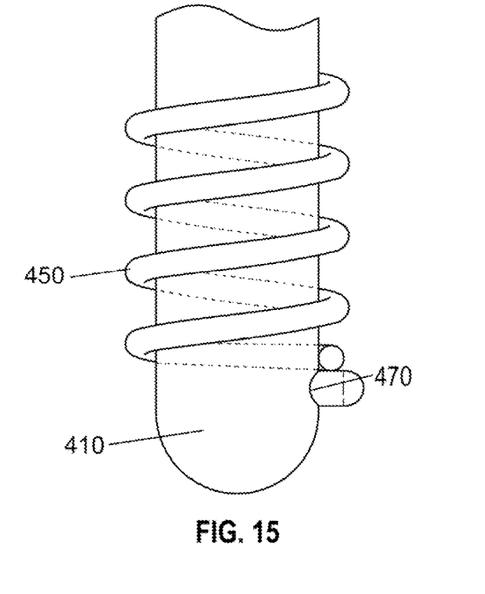
FIG. 15 shows an example of the shaft spring seat (470) on the shaft (410) in accordance with the present invention, wherein the spring (450) rests on a protrusion.
Figure 16:
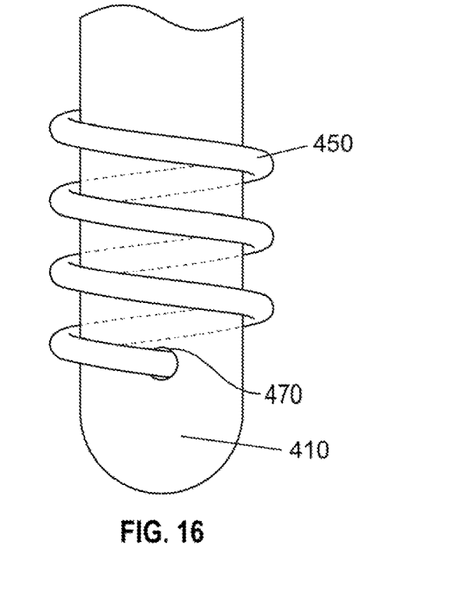
FIG. 16 shows an example of the shaft spring seat (470) on the shaft (410) in accordance with the present invention, wherein the spring is inserted through a recession in the shaft (410).
Figure 17:
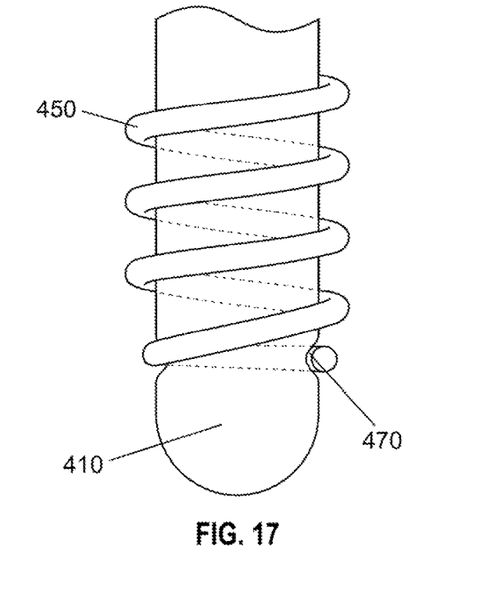
FIG. 17 shows an example of the shaft spring seat (470) on the shaft (410) in accordance with the present invention, wherein the spring is lodged in groove on the shaft (410).
Figure 18:
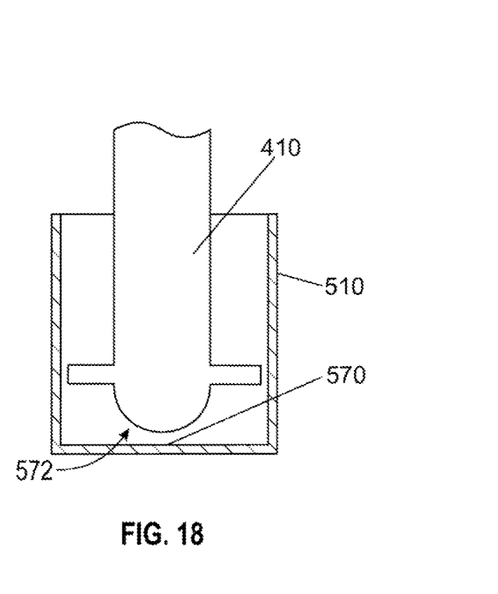
FIG. 18 shows an example of the piston channel (572), wherein the shaft (410) directly contacts the piston shaft rest surface (570).
Figure 19:
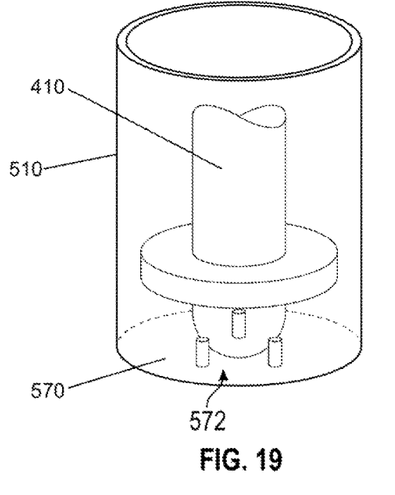
FIG. 19 shows an example of the piston channel (572), wherein the shaft (410) contacts short posts evenly and centrally distributed on the piston shaft rest surface (570).
Figure 20:
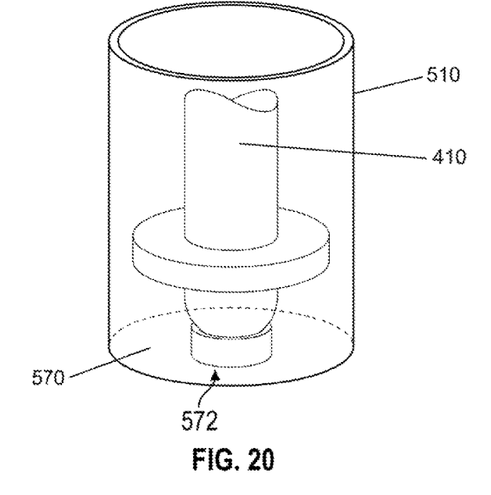
FIG. 20 shows an example of the piston channel (572), wherein the shaft contacts a hollow tube centrally disposed on the piston shaft rest surface (570).
Figure 21:
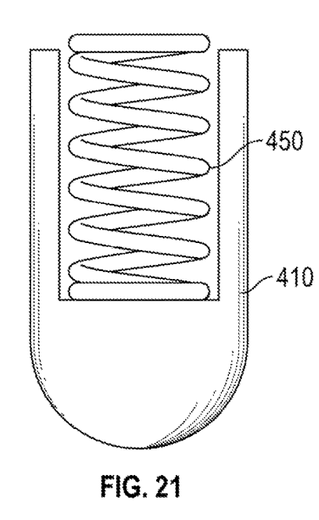
FIG. 21 shows an example of the spring (450) adjacent to the shaft (410) in the longitudinal direction, wherein the spring (450) is disposed within the shaft (410).

Without wishing to limit the present invention to any theory or mechanism, it is believed that the piston channel (572) funnels the shaft tip (460) contact with the piston channel (572) to effect a downward, centralized force relative to the piston central point (571). One advantage of this may be that the piston seal (550) and the main cylinder seal seat (690) engages uniformly, for example, across the entire sealing seat (690). This provides a tight and even seal between the two components. In particular, this allows for proper sealing when the desired pressure is reached.

Figure 13:
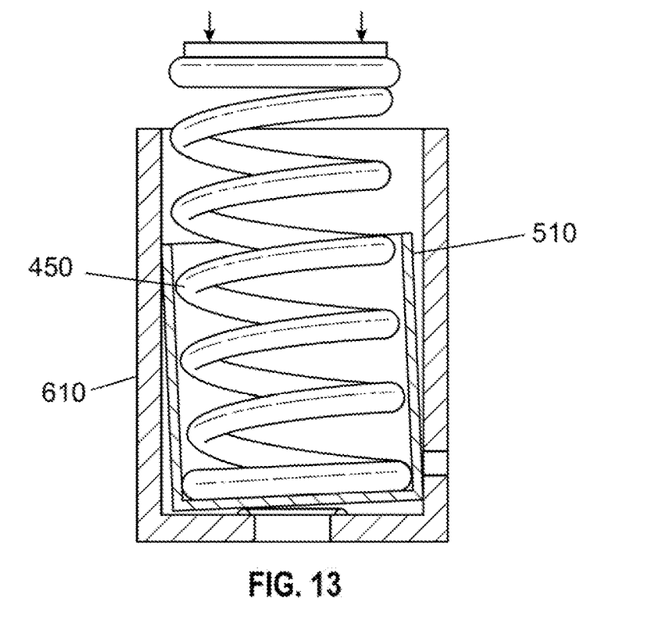
FIG. 13 shows the uneven seating due to the uneven spring coil ends, resulting in irregular force distribution and thus irregular seal.

Without the shaft tip (460) and piston channel (572) inducing a centralized force, the uneven coil ends of the spring (450) may cause the piston seal (550) to sit irregularly on the main cylinder seal seat (690). This may reduce the precision of reaching the final pressure accurately, especially at low pressure.

Figure 10:
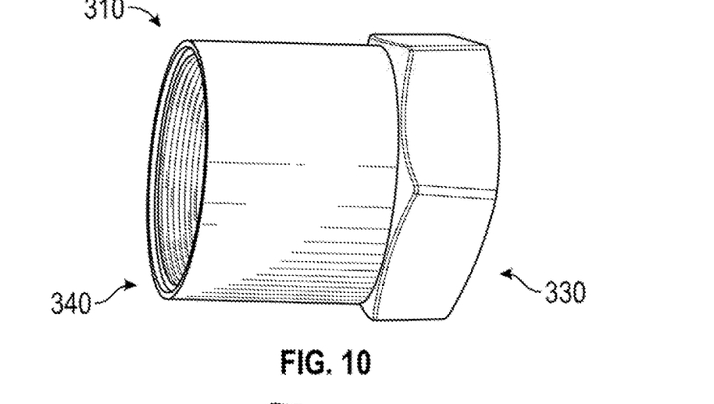
FIG. 10 shows the side view of the adjustment cap (310).
Figure 11:
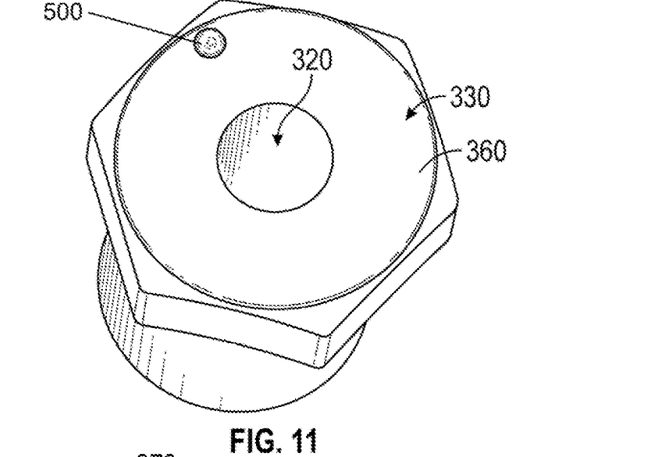
FIG. 11 shows the top view of the adjustment cap (310) with a reference mark (500).
Figure 12:
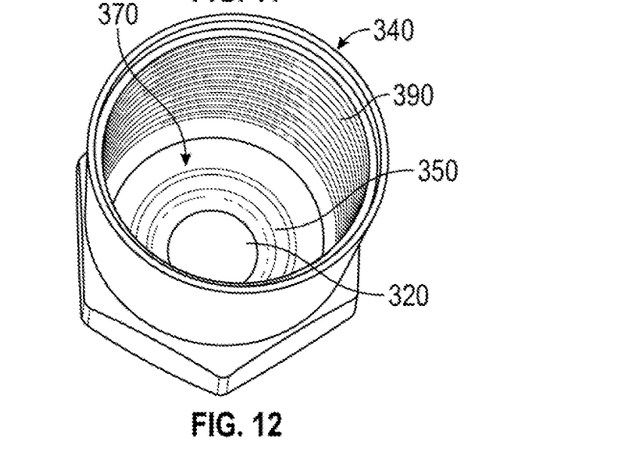
FIG. 12 shows the bottom view of the adjustment cap (310).

In some embodiments, a shaft aperture (440) (for example, a split ring receiver hole) runs through the shaft first end (420) along the diametric direction. The shaft first end (420) inserts through an adjustment cap aperture (320). An insert component (210) (for example, a split ring) then inserts through the shaft aperture (440). The shaft first end (430) position through the adjustment cap aperture (320) is thus maintained by the insert component (210). The spring (450) disposed adjacent to the shaft (410) is compressed by and between the shaft spring seat (470) and an adjustment cap spring seat (350).

In some embodiments, a main cylinder (610) having the main cylinder seal seat (690) mates with an adjustment cap (310) having the adjustment cap aperture (320) and the adjustment cap spring seat (350). This holds components together and completes the assembly of the system (100).

Figure 2:
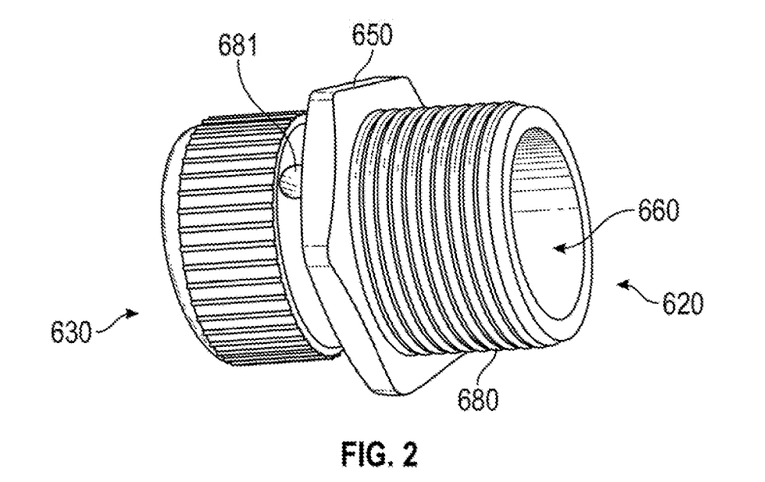
FIG. 2 shows the side view of the main cylinder (610).

An example of how the controlled tire deflation valve system (100) is used is as follows: The extent of the mating between the main cylinder (610) and the adjustment cap (310) is adjusted according to the desired pressure. This may be the "shut OFF pressure". The system (100) is attached to the tire valve stem. In some embodiments, the length of the main cylinder depression post (671) allows the controlled tire deflation valve system (100) to engage and disengage the tire valve stem with fewer threading. The tire will then deflate to the desired pressure as air within the tire escapes through the main cylinder air passage apertures (691) and the main cylinder main cylinder vent hole (681). In some instances, when the system does not start to deflate automatically, it would be feasible to use the manual start, split ring at the top of the shaft, (410) to start the deflation process.) The spring (450) eventually overpowers the tire pressure as tire pressure decreases. This closes the gap between the piston seal (550) and the main cylinder seal seat (690). The tire then stops deflating. Without wishing to limit the present invention to any theory or mechanism, it is believed that the system (100) reduces tire deflation time.

NON-LIMITING EXAMPLE

In some embodiments, a controlled tire deflation valve system (100) comprises an insert component (210) (for example, a split ring).

In some embodiments, the controlled tire deflation valve system (100) comprises an adjustment cap (310) that has an adjustment cap first end (330) and an adjustment cap second end (340). An adjustment cap surface (360) is disposed on the adjustment cap first end (330). An adjustment cap aperture (320) is centrally disposed on the adjustment cap surface (360). An adjustment cap cavity (370) is formed from the adjustment cap surface (360) towards the adjustment cap first end (330). In some embodiments, an indentation is disposed at the bottom of the adjustment cap cavity (370) to form an adjustment cap spring seat (350). In some embodiments, an adjustment cap threading (390) is disposed on the walls of the adjustment cap cavity (370). In some embodiments, an alternative adjustment cap threading (800) is disposed radially on the outside surface of the adjustment cap (310).

In some embodiments, the controlled tire deflation valve system (100) comprises a shaft (410) that has a shaft first end (420) and a shaft second end (430). In some embodiments, the shaft (410) has a shaft aperture (440) (for example, a pull ring or split ring receiver hole) running through the shaft first end (420) along the diametric direction. In some embodiments, a shaft rounded tip (460) is disposed on the shaft second end (430). In some embodiments, a shaft spring seat (470) is disposed above the shaft rounded tip (460). In some embodiments, the shaft spring seat (470) may be a protrusion. In some embodiments, the shaft spring seat (470) may be a recession. In some embodiments, the shaft (410) runs through a spring (450) until the spring (450) rests on the shaft spring seat (470). The shaft spring seat (470) is effective in restricting the movement of the spring (450).

In some embodiments, the controlled tire deflation valve system (100) comprises a piston (510) that has a piston first end (520) and a piston second end (530). A piston surface (560) is disposed on the piston second end (530). In some embodiments, a piston seal (550) is attached on the piston surface (560). A piston cavity (540) is formed from the piston surface (560) towards the piston first end (520). A piston shaft rest surface (570) is disposed at the bottom of the piston cavity (540). In some embodiments, a piston channel (572) is centrally disposed on the piston shaft rest surface (570). In some embodiments, a piston central point (571) is centrally disposed on the piston shaft rest surface (570).

Figure 3:
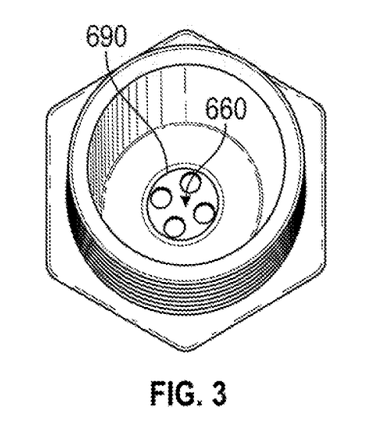
FIG. 3 shows the top view of the main cylinder (610).
Figure 4:
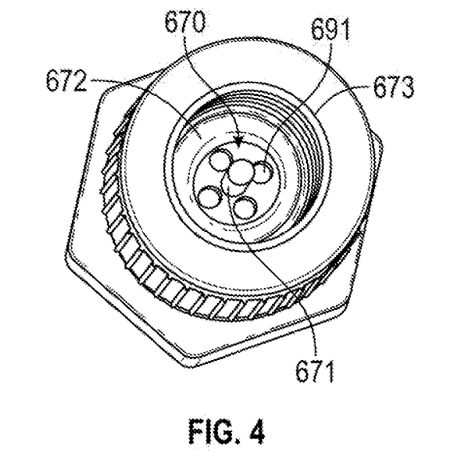
FIG. 4 shows the bottom view of the main cylinder (610).
Figure 5:
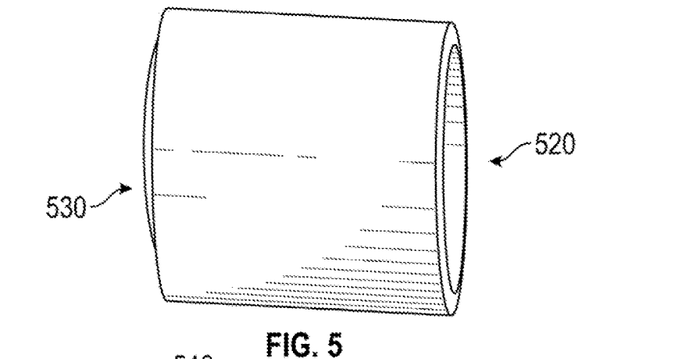
FIG. 5 shows the side view of the piston (510).
Figure 6:
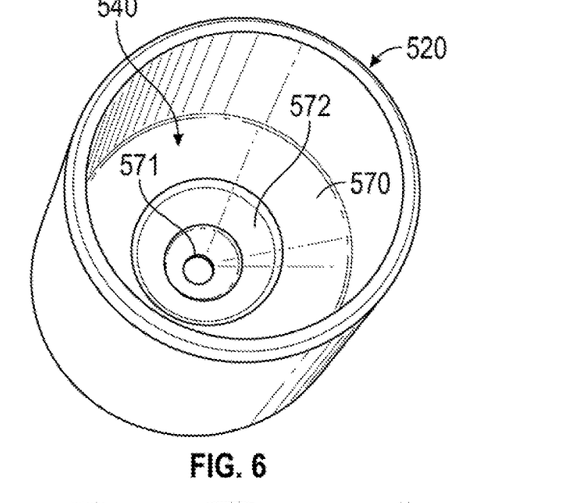
FIG. 6 shows the top view of the piston (510).
Figure 7:
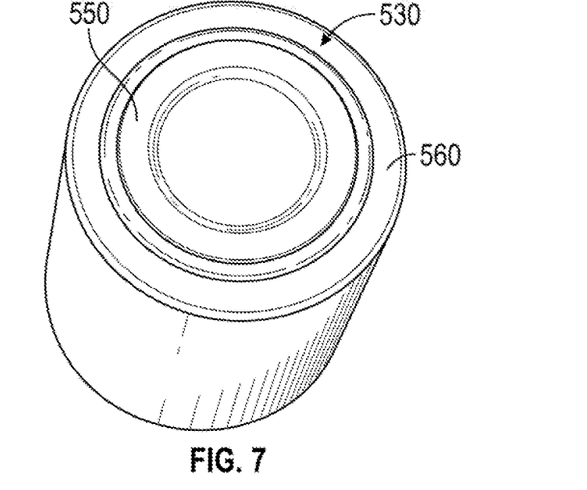
FIG. 7 shows the bottom view of the piston (510).
Figure 8:
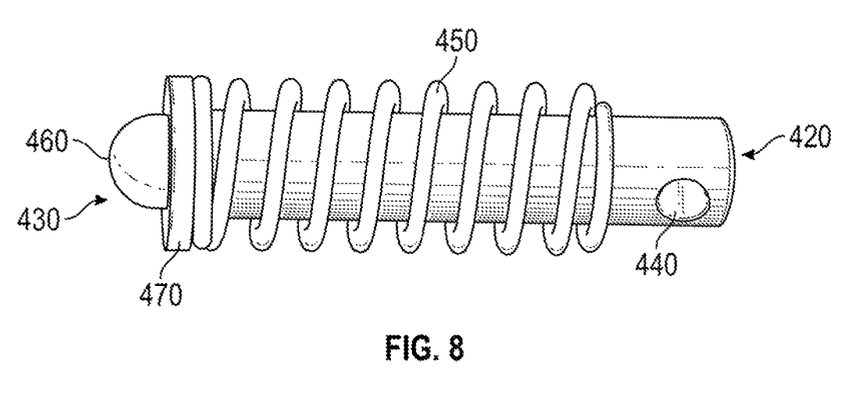
FIG. 8 shows the side view of the shaft (410) inserted into the spring (450).
Figure 9:
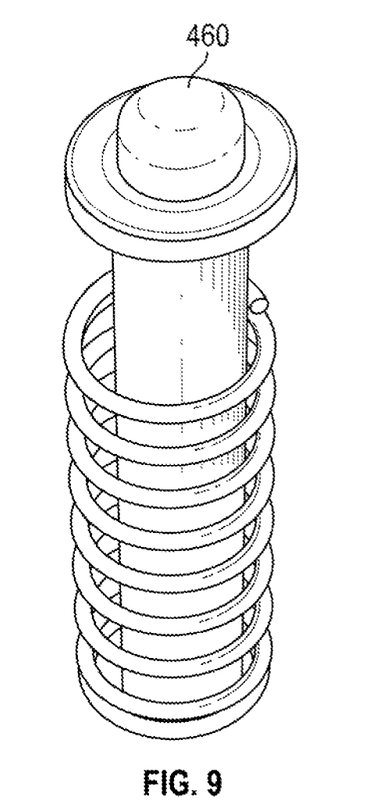
FIG. 9 shows the isometric view of the shaft (410) inserted into the spring (450).

In some embodiments, the controlled tire deflation valve system (100) comprises a main cylinder (610) that has a main cylinder first end (620) and a main cylinder second end (630). In some embodiments, a main cylinder vent hole (681) is disposed on the surface of the main cylinder (610). In some embodiments, a plate is disposed within the main cylinder (610). A main cylinder first cavity (660) is formed from this plate towards the main cylinder first end (620). A main cylinder second cavity (670) is formed from this plate towards the main cylinder second end (630).

In some embodiments, a main cylinder threading (680) is partially disposed on the main cylinder (610) from the main cylinder first end (620) toward the main cylinder second end (630). In some embodiments, a main cylinder lock ring (650) is disposed on the main cylinder threading (680) (for example, the main cylinder lock ring (650) is screwed onto the main cylinder threading (680)). In some embodiments, an alternative main cylinder threading (900) is partially disposed on the walls of the main cylinder first cavity (660).

In some embodiments, a rim is disposed at the bottom of the main cylinder first cavity (660) to form a main cylinder seal seat (690). In some embodiments, a plurality of main cylinder air passage apertures (691) is disposed within the main cylinder seal seat (690). In some embodiments, a main cylinder depression post (671) is centrally disposed at the bottom of the main cylinder second cavity (670). In some embodiments, the main cylinder depression post (671) is at the center of the main cylinder seat (690). In some embodiments, a main cylinder O-ring (672) is disposed at the bottom of the main cylinder second cavity (670). In some embodiments, the main cylinder depression post (671) runs through the main cylinder O-ring (672). In some embodiments, the main cylinder O-ring (672) is disposed along the edge of the walls of the main cylinder second cavity (670). In some embodiments, a main cylinder second cavity threading (673) is disposed on the walls of the main cylinder second cavity (670).

In some embodiments, the assembly is as follows: the shaft (410) is disposed within the adjustment cap (310). The shaft first end (420) inserts through the adjustment cap aperture (320). The insert component (210) (for example, the split ring) inserts through the shaft aperture (440) (for example, the split ring receiver hole) to maintain the shaft first end (430) position through the adjustment cap aperture (320). The insert component (210) acts as a stopper to prevent the shaft first end (430) from slipping through the adjustment cap aperture (320). The spring (450) wrapped around the shaft (410) is thus compressed by and between the shaft spring seat (470) and the adjustment cap spring seat (350).

In some embodiments, the assembly continues as follows: the piston (510) is disposed and sandwiched between the rounded shaft tip (460) and the main cylinder seal seat (690). The piston seal (550) on the piston surface (560) is disposed adjacent to the main cylinder seal seat (690). The rounded shaft tip (460) rests on the piston channel (572). The main cylinder (610) then mates with the adjustment cap (310). For example, the adjustment cap threading (390) screws onto the main cylinder threading (680). In another example, the alternative adjustment cap threading (800) screws into the alternative main cylinder threading (900).

Figure 22:
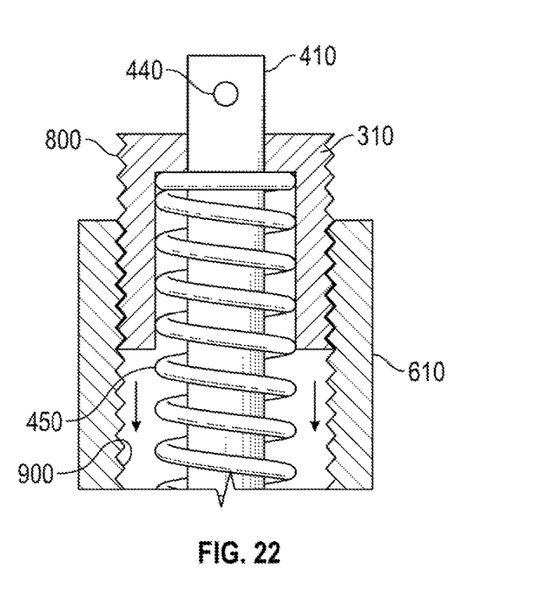
FIG. 22 shows an alternative adjustment cap (310) of the present invention.

In some embodiments, the adjustment cap (310) is screwed onto (depending on whether the alternative adjustment cap threading (800) and alternative main cylinder threading (900) combination is used) the main cylinder (610) based on the tire pressure desired. In some embodiments, the further the adjustment cap (310) is screwed down, the higher the resistance of the spring (450) and the sooner the controlled tire deflation valve system (100) shuts off. The result may be a relatively higher final pressure. In some embodiments, the main cylinder lock ring (650) maintains the adjustment cap (310) position relative to the main cylinder (610). In some embodiments, the lock ring (650) is unnecessary as the adjustment cap threading (390) and the main cylinder threading (660) have a tight fit. In some embodiments, the lock ring (650) is omitted as the alternative cap threading (800) and the alternative main cylinder threading (900) have a tight fit and are used instead.

In some embodiments, the controlled tire deflation valve system (100) is then attached to a tire valve stem. In some embodiments, the length of the main cylinder depression post (671) allows the controlled tire deflation valve system (100) to engage and disengage the tire valve stem with fewer threading. In some embodiments, the tire may then begin to deflate until the spring (450) overpowers the tire pressure and closes the gap between the piston seal (550) and the main cylinder seal seat (690). In some embodiments, this indicates a completed tire deflation process.

In some embodiments, the insert component (210) (for example, the split ring) may be pulled and maintained in the pulled position to manually release tire pressure. The tire may continue to deflate until the insert component (210) is allowed to return to its original position. In some embodiments, it is not necessary to manually maintain pull. Air pressure keeps air flowing out until spring overcomes air pressure.

Residue pressure may occur due to surrounding temperature and environment. In some embodiments, the insert component (210) may be pulled once to allow residue pressure in the tire to release. In some embodiments, the insert component (210) returns to its original position once the residue pressure is released and the system (100) shuts off.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A controlled tire deflation valve system (100), comprising:

an insert component (210);

an adjustment cap (310) having an adjustment cap first end (330) and an adjustment cap second end (340), an adjustment cap surface (360) disposed on the adjustment cap first end (330), wherein the adjustment cap surface (360) has a centrally disposed adjustment cap aperture (320), an adjustment cap cavity (370) formed from the adjustment cap surface (360) towards the adjustment cap first end (330), an indentation disposed at a bottom of the adjustment cap cavity (370) to form an adjustment cap spring seat (350), an adjustment cap threading (390) disposed on a wall of the adjustment cap cavity (370), an alternative adjustment cap threading (800) disposed radially on an outside surface of the adjustment cap (310);

a shaft (410) having a shaft first end (420) and shaft second end (430), a shaft aperture (440) running through the shaft first end (420) along a diametric direction, a shaft rounded tip (460) disposed on the shaft second end (430), a shaft spring seat (470) disposed above the shaft rounded tip (460), wherein the shaft spring seat (470) is a protrusion, a shaft spring seat (470) disposed above the shaft rounded tip (460), wherein the shaft spring seat (470) is a recession, a spring (450) through which the shaft (410) runs until the spring (450) rests on the shaft spring seat (470) disposed above the shaft rounded tip (460), wherein the shaft spring seat (470) is effective in restricting movement of the spring (450);

a piston (510) having a piston first end (520) and a piston second end (530), a piston surface (560) disposed on the piston second end (530), on which a piston seal (550) is attached, a piston cavity (540) formed from the piston surface (560) towards the piston first end (520), a piston shaft rest surface (570) disposed at a bottom of the piston cavity (540), a piston channel (572) centrally disposed on the piston shaft rest surface (570), a piston central point (571) centrally disposed on the piston shaft rest surface (570);

a main cylinder (610) having a main cylinder first end (620) and a main cylinder second end (630), a main cylinder vent hole (681) disposed on a surface of the main cylinder (610) effective in relieving pressure, a plate disposed within the main cylinder (610) to form a main cylinder first cavity (660) towards the main cylinder first end (620) and a main cylinder second cavity (670) towards the main cylinder second end (630), a rim disposed at a bottom of the main cylinder first cavity (660) to form a main cylinder seal seat (690), a plurality of main cylinder air passage apertures (691) disposed within the main cylinder seal seat (690), a main cylinder depression post (671) centrally disposed at a bottom of the main cylinder second cavity (670), a main cylinder O-ring (672) disposed at the bottom of the main cylinder second cavity (670) and through which the main cylinder depression post (671) runs, a main cylinder second cavity threading (673) disposed on a wall of the main cylinder second cavity (670), a main cylinder threading (680) partially disposed on the main cylinder (610), a main cylinder lock ring (650) disposed on the main cylinder threading (680), an alternative main cylinder threading (900) partially disposed on a wall of the main cylinder first cavity (660);

wherein the shaft (410) is disposed within the adjustment cap (310), the shaft first end (420) inserts through the adjustment cap aperture (320), the insert component (210) inserts through the shaft aperture (440) to maintain the shaft first end (430) position through the adjustment cap aperture (320), the spring (450) wrapped around the shaft (410) is compressed by and between the shaft spring seat (470) and the adjustment cap spring seat (350), wherein the main cylinder (610) mates with the adjustment cap (310), the piston (510) is sandwiched between the rounded shaft tip (460) and the main cylinder seal seat (690), the piston seal (550) is disposed adjacent to the main cylinder seal seat (690), the rounded shaft tip (460) rests on the piston channel (572).

2. A controlled tire deflation valve system (100), comprising:
- a shaft (410) having a shaft first end (420) and shaft second end (430), a shaft tip (460) disposed on the shaft second end (430), a spring (450) adjacent to the shaft (410) in a longitudinal direction;
- a piston (510) having a piston first end (520) and a piston second end (530), a piston surface (560) disposed on the piston second end (530), on which a piston seal (550) is attached, a piston cavity (540) formed from the piston surface (560) towards the piston first end (520), wherein the piston (510) is sandwiched between the shaft tip (460) and a main cylinder seal seat (690), the piston seal (550) is disposed adjacent to the main cylinder seal seat (690), the shaft tip (460) rests on a piston channel (572).

3. The controlled tire deflation valve system (100) of claim 2, wherein the shaft tip (460) is rounded.

4. The controlled tire deflation valve system (100) of claim 2, wherein the shaft (410) runs through the spring (450) until the spring (450) rests on a shaft spring seat (470) effective in restricting movement of the spring (450).

5. The controlled valve system (100) of claim 4, wherein the shaft spring seat (470) is a recession disposed above the shaft tip (460).

6. The controlled valve system (100) of claim 4, wherein the shaft spring seat (470) is a protrusion disposed above the shaft tip (460).

7. The controlled tire deflation valve system (100) of claim 4, wherein a shaft aperture (440) runs through the shaft first end (420) along a diametric direction.

8. The controlled tire deflation valve system (100) of claim 2, wherein the piston channel (572) is centrally disposed on a piston shaft rest surface (570).

9. The controlled tire deflation valve system (100) of claim 8, wherein the piston shaft rest surface (570) is disposed at a bottom of the piston cavity (540).

10. The controlled tire deflation valve system (100) of claim 9, wherein the piston shaft rest surface (570) comprises a piston central point (571).

11. The controlled tire deflation valve system (100) of claim 10, wherein the shaft tip (460) contacts with the piston channel (572) to effect a downward, centralized force relative to the piston central point (571), engaging the piston seal (550) and the main cylinder seal seat (690) to provide a tight and even seal between the two components.

12. The controlled tire deflation valve system (100) of claim 7, wherein the shaft first end (420) inserts through an adjustment cap aperture (320), an insert component (210) inserts through the shaft aperture (440) to maintain a position of the shaft first end (420) through the adjustment cap aperture (320), the spring (450) wrapped around the shaft (410) is compressed by and between the shaft spring seat (470) and an adjustment cap spring seat (350).

13. The controlled tire deflation valve system (100) of claim 12, further comprising a main cylinder (610) having the main cylinder seal seat (690) mating with an adjustment cap (310) having the adjustment cap aperture (320) and the adjustment cap spring seat (350).

* * * * *